United States Patent
Wolf-Monheim

(10) Patent No.: US 10,710,647 B2
(45) Date of Patent: Jul. 14, 2020

(54) MOTOR VEHICLE INCLUDING DEVICE FOR DELIMITATION OF EXTENDED LOADING AREA AND METHOD OF USE

(71) Applicant: Ford Global Technologies, LLC, Dearborn, MI (US)

(72) Inventor: Friedrich Peter Wolf-Monheim, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 158 days.

(21) Appl. No.: 16/018,122

(22) Filed: Jun. 26, 2018

(65) Prior Publication Data

US 2019/0092400 A1    Mar. 28, 2019

(30) Foreign Application Priority Data

Sep. 26, 2017   (DE) ........................ 10 2017 217 088

(51) Int. Cl.
| | |
|---|---|
| *B62D 25/00* | (2006.01) |
| *B62D 33/08* | (2006.01) |
| *B62D 33/027* | (2006.01) |
| *B62D 33/037* | (2006.01) |

(52) U.S. Cl.
CPC .......... *B62D 33/08* (2013.01); *B62D 33/027* (2013.01); *B62D 33/0273* (2013.01); *B62D 33/037* (2013.01)

(58) Field of Classification Search
CPC ....... B82Y 10/00; B82Y 40/00; G03F 7/0002; G03F 9/00; B44D 3/185; A61F 5/0106; A61F 5/0125; A61F 5/0127; A61F 5/028; A63B 21/4029
See application file for complete search history.

(56) References Cited

U.S. PATENT DOCUMENTS

| | | | | |
|---|---|---|---|---|
| 4,596,417 A | * | 6/1986 | Bennett ................... | B60P 1/435 296/61 |
| 5,468,038 A | * | 11/1995 | Sauri ................... | B62D 33/0273 296/26.1 |
| 5,658,033 A | * | 8/1997 | Delaune ................... | B60R 9/06 224/402 |
| 5,700,047 A | * | 12/1997 | Leitner ................... | B60P 1/003 224/404 |
| 5,755,480 A | * | 5/1998 | Bryan ....................... | B60P 3/40 224/403 |
| 5,775,759 A | * | 7/1998 | Cummins .......... | B62D 33/0273 296/26.11 |

(Continued)

*Primary Examiner* — Kiran B Patel
(74) *Attorney, Agent, or Firm* — David Coppiellie; Carlson, Gaskey & Olds, P.C.

(57) ABSTRACT

The present disclosure relates to a motor vehicle, and more specifically relates to a motor vehicle including a device for the delimitation of an extended loading area. This disclosure also relates to a corresponding method of using the subject device. In particular, the disclosed device comprises a plurality of braces (or, posts). Each of the braces comprises a longitudinal axis. The braces are connected to one another such that the spacing is variable. In one example, adjacent braces are connected by a connection element that can be deformed perpendicularly relative to the longitudinal axes. In particular, the connection elements can be elastically deformed such that they are capable of returning to their original shape after deformation.

20 Claims, 5 Drawing Sheets

(56) References Cited

U.S. PATENT DOCUMENTS

| | | | | |
|---|---|---|---|---|
| 5,788,311 A | * | 8/1998 | Tibbals | B62D 33/0273 296/26.11 |
| 5,806,907 A | * | 9/1998 | Martinus | B62D 33/0273 296/26.11 |
| 5,816,638 A | * | 10/1998 | Pool, III | B60P 1/435 296/26.11 |
| 5,820,188 A | * | 10/1998 | Nash | B62D 33/0273 296/26.11 |
| 5,823,596 A | * | 10/1998 | Kulesza | B60P 3/40 296/26.08 |
| 5,924,753 A | * | 7/1999 | DiBassie | B62D 33/0273 296/26.09 |
| 5,941,588 A | * | 8/1999 | Marconi | B62D 33/0273 296/26.11 |
| 5,997,066 A | * | 12/1999 | Scott | B62D 33/0273 296/26.08 |
| 6,007,127 A | * | 12/1999 | Garofalo | B62D 33/0273 296/26.11 |
| 6,019,410 A | * | 2/2000 | Trostle | B60P 3/40 296/26.11 |
| 6,082,801 A | * | 7/2000 | Owen | B60P 3/40 296/26.08 |
| 6,142,548 A | * | 11/2000 | Kuhn | B60P 3/40 296/26.1 |
| 6,155,622 A | * | 12/2000 | Reed | B62D 33/0273 296/26.08 |
| 6,158,797 A | * | 12/2000 | Bauer | B60P 1/435 296/61 |
| 6,179,360 B1 | * | 1/2001 | Davian | B60P 3/40 296/26.08 |
| 6,227,593 B1 | * | 5/2001 | De Valcourt | B60P 1/435 296/26.08 |
| 6,322,125 B2 | * | 11/2001 | Bauer | B60P 1/435 296/26.1 |
| 6,340,190 B1 | * | 1/2002 | Rosebrugh | B60P 3/40 296/26.11 |
| 6,402,215 B1 | * | 6/2002 | Leitner | B60P 3/40 296/26.11 |
| 6,435,588 B1 | * | 8/2002 | Bauer | B60P 1/435 296/55 |
| 6,494,520 B2 | * | 12/2002 | Brzenchek | B62D 33/023 16/DIG. 6 |
| 6,513,688 B2 | * | 2/2003 | Kmita | B60P 3/40 224/403 |
| 6,540,123 B1 | * | 4/2003 | Kmita | B60P 3/40 224/403 |
| 6,676,182 B2 | * | 1/2004 | Fitts | B60P 3/40 224/403 |
| 6,764,121 B1 | * | 7/2004 | Bauer | B60P 1/435 296/37.6 |
| 6,908,134 B1 | * | 6/2005 | Summers | B60P 3/40 296/26.11 |
| 6,948,755 B1 | * | 9/2005 | Bauer | B60P 1/435 296/37.6 |
| 6,948,763 B2 | * | 9/2005 | Robbins | B60P 3/40 296/1.07 |
| 6,994,389 B1 | * | 2/2006 | Graffy | B60P 3/40 296/26.08 |
| 7,007,995 B1 | * | 3/2006 | Scarberry | B60P 3/40 296/26.11 |
| 7,040,683 B1 | * | 5/2006 | Beach | B62D 33/0273 296/57.1 |
| 7,121,604 B2 | * | 10/2006 | Reed | B60P 3/40 296/26.11 |
| 7,195,432 B2 | * | 3/2007 | Earle | B60P 3/40 296/26.09 |
| 7,204,537 B1 | * | 4/2007 | Oh | B60P 3/077 296/26.09 |
| D544,826 S | * | 6/2007 | Smith | D12/414 |
| 7,226,100 B1 | * | 6/2007 | Willey | B62D 33/03 296/26.11 |
| 7,240,940 B2 | * | 7/2007 | Leitner | B62D 33/0273 296/26.11 |
| 7,281,745 B1 | * | 10/2007 | Meinke | B60P 3/40 296/26.08 |
| 7,287,798 B2 | * | 10/2007 | King | B60P 3/40 296/57.1 |
| 7,458,624 B1 | * | 12/2008 | Bower | B60P 3/07 296/61 |
| 7,464,976 B2 | * | 12/2008 | Smith | B60R 9/00 296/26.11 |
| 7,566,085 B2 | * | 7/2009 | Jaskolski | B62D 33/0273 296/37.6 |
| 7,712,811 B2 | * | 5/2010 | Heaman | B62D 33/0273 296/26.08 |
| 8,070,207 B2 | * | 12/2011 | Zielinsky | B62D 33/0273 16/82 |
| 8,075,038 B2 | * | 12/2011 | Zielinsky | B62D 33/0273 16/82 |
| 8,109,552 B2 | * | 2/2012 | Nelson | B62D 33/0273 224/403 |
| 8,182,012 B1 | * | 5/2012 | Brister | B60P 3/40 296/26.11 |
| 8,727,415 B2 | * | 5/2014 | Smith | B62D 33/0273 296/26.08 |
| 8,757,694 B1 | * | 6/2014 | Kuhnle | B62D 33/033 296/26.08 |
| 9,108,687 B2 | * | 8/2015 | Lepage | B60P 3/40 |
| 9,387,806 B2 | * | 7/2016 | Bzoza | B60R 5/041 |
| 9,387,812 B2 | * | 7/2016 | Bexar | B60R 9/06 |
| 9,452,782 B1 | * | 9/2016 | Singer | B62D 33/0273 |
| 9,481,316 B2 | * | 11/2016 | Faruque | B60R 9/06 |
| 9,487,247 B2 | * | 11/2016 | Glover | B60P 1/003 |
| 9,540,051 B2 | * | 1/2017 | Bauer | B62D 33/03 |
| 9,586,514 B2 | * | 3/2017 | Asao | B60P 1/64 |
| 9,592,860 B1 | * | 3/2017 | Singer | B62D 21/14 |
| 9,789,913 B2 | * | 10/2017 | Singer | B62D 21/14 |
| 9,834,260 B2 | * | 12/2017 | Quick | B62D 33/0273 |
| 9,840,206 B2 | * | 12/2017 | Bales | B60R 9/06 |
| 9,862,429 B2 | * | 1/2018 | Castillo | B62D 33/0273 |
| 9,878,652 B2 | * | 1/2018 | DeSimone | B60P 1/435 |
| 9,896,004 B1 | * | 2/2018 | Kahl | B60N 2/3095 |
| 9,902,307 B2 | * | 2/2018 | Higgins | B60P 7/15 |
| 9,938,753 B1 | * | 4/2018 | Hemphill | E05B 77/44 |
| 9,956,996 B2 | * | 5/2018 | Astrike | B60P 7/02 |
| 10,029,741 B2 | * | 7/2018 | Singer | B62D 33/0273 |
| 10,065,567 B2 | * | 9/2018 | Garrison | B60R 11/06 |
| 10,076,991 B2 | * | 9/2018 | Buckhalt | B60P 3/40 |
| 10,086,775 B2 | * | 10/2018 | Spahn | B60R 11/06 |
| 10,093,362 B2 | * | 10/2018 | Estrada | B62D 33/037 |
| 10,214,250 B2 | * | 2/2019 | Hemphill | B60R 3/02 |
| 10,239,567 B1 | * | 3/2019 | Parrish | B62D 33/027 |
| 10,246,137 B2 | * | 4/2019 | Ngo | B60R 3/02 |
| 10,308,292 B1 | * | 6/2019 | Shedden | B62D 33/03 |
| 2008/0106111 A1 | * | 5/2008 | Pritchard | B60R 3/02 296/62 |
| 2008/0111390 A1 | * | 5/2008 | Smith | B62D 33/033 296/50 |
| 2008/0231067 A1 | * | 9/2008 | Nagle | B60P 3/07 296/50 |
| 2009/0108612 A1 | * | 4/2009 | Smith | B62D 33/027 296/50 |

\* cited by examiner

MOTOR VEHICLE INCLUDING DEVICE FOR DELIMITATION OF EXTENDED LOADING AREA AND METHOD OF USE

RELATED APPLICATIONS

This application claims priority to German Patent Application No. 102017217088.3, filed on Sep. 26, 2017, the entirety of which is herein incorporated by reference.

TECHNICAL FIELD

The present disclosure relates to a motor vehicle, and more specifically relates to a motor vehicle including a device for the delimitation of an extended loading area. This disclosure also relates to a corresponding method of using the device.

BACKGROUND

An extension of the loading area of a motor vehicle in the region of the tailgate is represented by any means for extending, in particular lengthening, the available loading area where necessary. It is, in particular, popular among users of trucks, such as pickup trucks. It is desirable in this case for the tailgate extension systems to be easy and convenient to handle, lightweight, reasonably priced, robust, and resilient in design.

One example of a tailgate extension for a pickup truck is described in U.S. Pat. No. 5,924,753. In the '753 patent, a side brace is extended telescopically relative to the folded-down tailgate. Specifically, two brace elements are each inserted telescopically inside one another. However, the side braces take up a relatively large amount of space in the stowed position, and in particular they take up part of the available loading area.

SUMMARY

A device for the lateral delimitation of an extended loading area of a motor vehicle according to an exemplary aspect of the present disclosure includes, among other things, a plurality of braces, each with a longitudinal axis, connected such that spacing between adjacent braces is variable. Adjacent braces are connected together with a connection element deformable perpendicularly relative to the longitudinal axes.

In a further non-limiting embodiment of the foregoing device, the longitudinal axes of the braces are substantially parallel to one another.

In a further non-limiting embodiment of any of the foregoing devices, at least one of the braces comprises a first end and a second end, and at least one of the first end and the second end is configured to be moved along a guide rail.

In a further non-limiting embodiment of any of the foregoing devices, the device comprises at least one guide rail configured to allow a movement of the braces along the guide rail.

In a further non-limiting embodiment of any of the foregoing devices, the device is configured to be moved into a side wall adjacent a loading area.

In a further non-limiting embodiment of any of the foregoing devices, at least one of the braces includes a cavity for at least partially receiving the at least one connection element.

In a further non-limiting embodiment of any of the foregoing devices, the at least one brace comprises at least one opening for the at least partial receiving of the at least one connection element.

In a further non-limiting embodiment of any of the foregoing devices, the opening comprises a center axis arranged perpendicularly to the longitudinal axis of the at least one brace.

In a further non-limiting embodiment of any of the foregoing devices, the at least one connection element comprises a locking element for resisting removal of the connection element from the cavity.

In a further non-limiting embodiment of any of the foregoing devices, the at least one connection element comprises a longitudinal axis and is configured in such a manner that it can be bent or folded in at least one radial direction.

In a further non-limiting embodiment of any of the foregoing devices, the at least one connection element comprises elastic material.

In a further non-limiting embodiment of any of the foregoing devices, the at least one connection element comprises at least one joint element.

A motor vehicle according to an exemplary aspect of the present disclosure includes, among other things, an extended loading area, and a device selectively moveable between a stowed position and a deployed position in which the device delimits the extended loading area. The device comprises a plurality of braces, each with a longitudinal axis, connected such that spacing between adjacent braces is variable. Further, adjacent braces are connected together with at least one connection element deformable perpendicularly relative to the longitudinal axes.

In a further non-limiting embodiment of the foregoing motor vehicle, a tailgate is moveable between an open position and a closed position, and the tailgate defines at least a portion of the extended loading area when in the open position.

In a further non-limiting embodiment of any of the foregoing motor vehicles, the tailgate comprises at least one guide rail for receiving ends of the braces, and the at least one guide rail guiding movement of the braces.

A method according to an exemplary aspect of the present disclosure includes, among other things, delimiting an extended loading area of a motor vehicle by deploying a device including a plurality of braces. Further, each of the braces each has a longitudinal axis, and adjacent ones of the braces are connected together with a connection element deformable perpendicularly relative to the longitudinal axes.

In a further non-limiting embodiment of the foregoing method, the method includes stowing the device by moving the plurality of braces into at least one side wall of the motor vehicle.

In a further non-limiting embodiment of any of the foregoing methods, the method includes folding a tailgate of the motor vehicle to an open position to provide the extended loading area.

In a further non-limiting embodiment of any of the foregoing methods, the step of deploying the device includes guiding the braces along a guide rail formed in the tailgate.

In a further non-limiting embodiment of any of the foregoing methods, the spacing between adjacent braces is variable.

DETAILED DESCRIPTION

Figure 1:
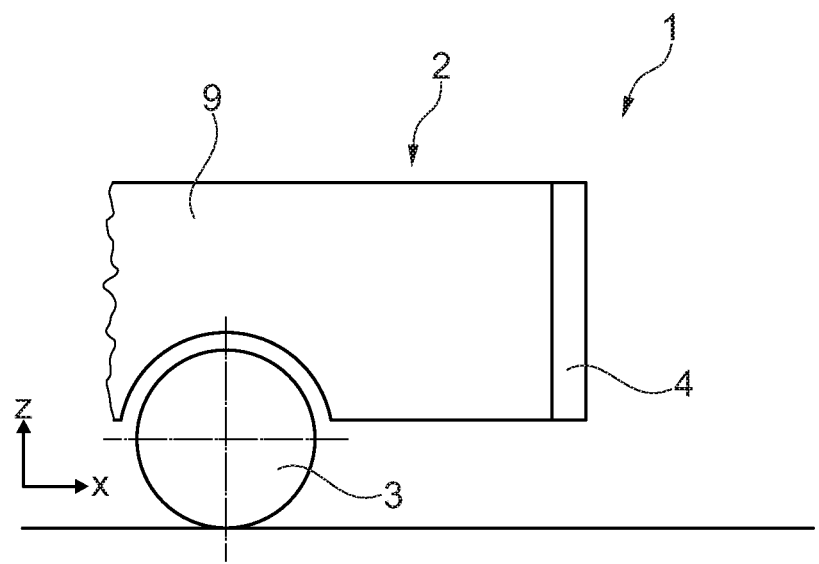
FIG. 1 schematically illustrates part of a motor vehicle according to the invention in side view.

The present disclosure relates to a motor vehicle, and more specifically relates to a motor vehicle including a device for the delimitation of an extended loading area. This disclosure also relates to a corresponding method of using the device. In particular, the disclosed device comprises a plurality of braces (or, posts). Each of the braces comprises a longitudinal axis. The braces are connected to one another such that the spacing, in particular the transverse spacing in relation to the longitudinal axis, can be varied. In one example, adjacent braces are connected by a connection element that can be deformed perpendicularly relative to the longitudinal axes. In particular, the connection elements can be elastically deformed such that they are capable of returning to their original shape after deformation.

Delimitation in the context of the present disclosure means to provide a limit or boundary of an area. The device of the present disclosure is capable of delimiting a loading area on the right side, left side, and also a rear of an extended loading area.

The device according to the invention has the advantage that through the variable or changeable spacing between the adjacent braces, the delimitation device can be pushed together and pulled apart. This means that it can be stowed away in a substantially smaller space than is known in the prior art. Furthermore, the deformable connection elements mean that the device can be arranged about the entire loading area, including both sides and the rear of the loading area.

In this example, the braces are arranged parallel to one another relative to their longitudinal axes. The braces may each be arranged vertically, for example, and therefore create a fence-like delimitation.

In one embodiment, at least one brace, and in one particular embodiment each brace, comprises a first end and a second end in the direction of the longitudinal axis. In this case, at least one of the first end and the second end is/are configured to be moved along a guide rail. At least one of the aforementioned ends is configured to be moved in a transverse direction in relation to the longitudinal axis in a guide rail. The transverse direction may be a horizontal direction.

The device may comprise at least one guide rail which is configured to allow movement of the braces along the guide rail. For example, a first guide rail, for example a vertically upper guide rail, for receiving the first end of at least one brace or the first ends of the of braces which are configured with a corresponding end, may be provided. In addition or alternatively, a second guide rail may be provided, for example a vertically lower guide rail, for receiving the second end of at least one brace, in this example the second ends of the plurality of braces which are configured with an end of this kind.

An element or region of the first end and/or of the second end of at least one brace, such as of all braces, may be configured to be received in a guide rail. The embodiment of the device described with a guide rail and the corresponding embodiment of the braces for movement along or within the guide rail has the advantage that the braces can be moved along the rail arranged, for example, on the folded-down tailgate or another loading area extension. The braces, guided in this manner, may be pulled apart and pushed together. This facilitates a simple and reliable design of the delimitation device of the loading area and, accordingly, an easy to use assembly and dismantling of the extended loading area. The at least one guide rail also improves the stability of the delimitation in respect of forces exerted by the load. At the same time, the load is effectively prevented from falling from the loading area.

At least one brace, and in one example each brace, comprises a first end and a second end, wherein at least one connection assembly is arranged at the first end and/or at the second end. An arrangement of the connection assembly at the end or the ends of the braces has the advantage that the stability of the delimitation in respect of side or loads is increased in comparison with another arrangement of the connection assembly, for example in the middle of the braces in relation to the longitudinal axis. Any twisting of the braces during the pushing-together or pulling-apart is thereby effectively avoided. It is of course possible for the connection assembly to be arranged with the braces in another position and this has the advantage, compared with the described solution, that a further weight saving can thereby be achieved, particularly if two adjacent braces are only connected to one connection assembly in each case.

In another variant, the device is configured to be pushed into a side wall, for example a body element, or into a delimiting wall of a loading area. In this case, the braces may be directly pushed together and consequently stored in the smallest possible space. Pushing the device into a side wall has the advantage that in stowing away the device no loading space has to be sacrificed. In addition, the outward appearance of the vehicle on which the device is used is not negatively affected, as the device is not visible to onlookers in the stowed state.

At least one connection assembly may comprise a component with a cavity for the at least partial receiving of at least one deformable connection element, said component being arranged on a brace, for example fastened to a brace. The component with a cavity may, for example, be configured as a tubular element or as a housing component. The deformable connection element may be an elastically deformable connection element, for example. A connection assembly configured with a cavity for receiving a deformable connection element has the advantage that the connection elements used can each be pushed into cavity in the connection assembly or pulled out of the cavity. This allows the adjacent braces in each case to be pushed together or pulled apart and thereby enables the device to be stowed in the smallest space.

In principle, the component with a cavity may comprise at least one opening for the at least partial receiving, and in one example for the complete receiving, of a connection element. The opening may, in other words, be configured for the pushing-in and pulling-out of a connection element. In this case, the opening may comprise a center axis which is arranged perpendicularly to the longitudinal axis of the braces. An arrangement of this kind facilitates a fence-like, stable construction and therefore provides a robust design.

At least one connection element, and in one example all connection elements, may comprise a locking mechanism or else a locking element for preventing a complete removal of the connection element from the cavity. This may be realized in such a manner, for example, that the connection element comprises a longitudinal axis, a center region and two side regions, wherein the side regions enclose the center region along the longitudinal axis. The maximum dimension or maximum width of the side regions in the radial direction in this case is greater than that of the center region. The opening may, for example, be geometrically configured in such a manner that the side regions are each positioned in a cavity in a connection assembly and only the center region, but not the side regions, can be moved through the opening, in other words pushed into the opening or pulled out of the opening. The variant described has the advantage that it can be realized with simple geometric means and a simple and robust functionality is guaranteed.

The connection element may comprise a longitudinal axis and be configured in such a manner that it can be bent or folded in at least one radial direction in respect of the longitudinal axis. For this purpose, the connection element may comprise elastic material or at least one joint element, for example a hinge. The embodiment of the connection element described has the advantage that only one device or two device elements are necessary in order to delimit the extended loading area both to the side and also to the rear. The entire device or, in the case of the embodiment in the form of two device elements, each of the device elements can be pushed together and stowed away in a space-saving manner.

The motor vehicle according to the invention comprises a previously described device according to the invention. It has the same properties and advantages in principle as the previously described device according to the invention. The motor vehicle may, for example, be an automobile, a truck, a pickup, an SUV, a small truck or, in general, a van.

The motor vehicle according to the invention comprises a tailgate which is arranged horizontally in the open position. The tailgate may comprise an inside with at least one guide rail for receiving ends of the braces of the device for the delimitation of an extended, for example lengthened, loading area. The arrangement of at least one guide rail on the inside of the tailgate has the advantage that the braces of the device described above can be fastened in an easy-to-handle and simultaneously robust manner to form the delimitation of the loading area and fastened to the loading area.

Furthermore, the vehicle may comprise at least one side wall which is configured to receive braces and connection assemblies at least partially, and in one example the at least one side wall completely receives the braces and connection assemblies.

In a variant of the embodiment, the vehicle comprises a right side wall and a left side wall. In this variant, the device comprises a first device element and a second device element, wherein the first device element and the second device element can be connected to one another in the region of the tailgate, so for example on the inside of the tailgate when said tailgate is open. The first device element in this case is fastened to or in the left side wall and the second device element to or in the right side wall. The first device element may advantageously be completely stowed away in the left side wall and the second device element completely stowed in the right side wall.

Compared with the previously known loading area extension systems, the present disclosure has the advantage that it provides a simple solution that can be realized cost-effectively. In addition, the delimitation can be completely integrated in the vehicle structure. No additional tools are needed for assembly and dismantling. In addition, a very stable solution which can simultaneously be used in a user-friendly manner is provided.

In the various figures the same parts are provided with the same reference numerals, which is why generally these parts are only described once.

In each of the figures a Cartesian coordinate system is indicated with an x-axis, a y-axis and a z-axis, wherein the x-axis identifies the normal forward/rearward directions, the y-axis identifies the normal side-to-side directions, and the z-axis identifies the vertical directions. The terms "forward," "rearward," "side," and "vertical" are used herein relative to the normal operational attitude of the vehicle.

An exemplary embodiment of the present invention is explained in greater detail relative to FIGS. 1 to 9. The exemplary embodiment relates to a vehicle configured as a pickup truck. The invention is of course also applicable to other types of vehicles with a loading area that can be extended, for example lengthened, so for example for trucks, automobiles, pickups, vans, sport utility vehicles (SUVs), etc.

FIGS. 1 to 6 each show a rear detail of a motor vehicle 1 in different views. The motor vehicle 1 comprises a plurality of wheels 3, a loading area 2 with a left side wall 9 and a right side wall 10, and also a tailgate 4. The tailgate 4 and the side walls 9 and 10 constitute delimitations of the loading area 2.

Figure 2:
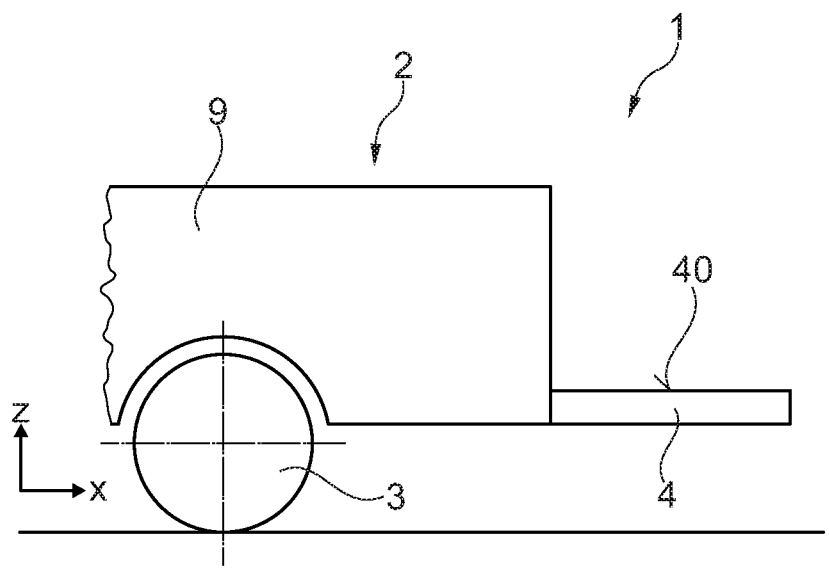
FIG. 2 schematically illustrates a detail of a motor vehicle according to the invention from the side with the tailgate open.
Figure 3:
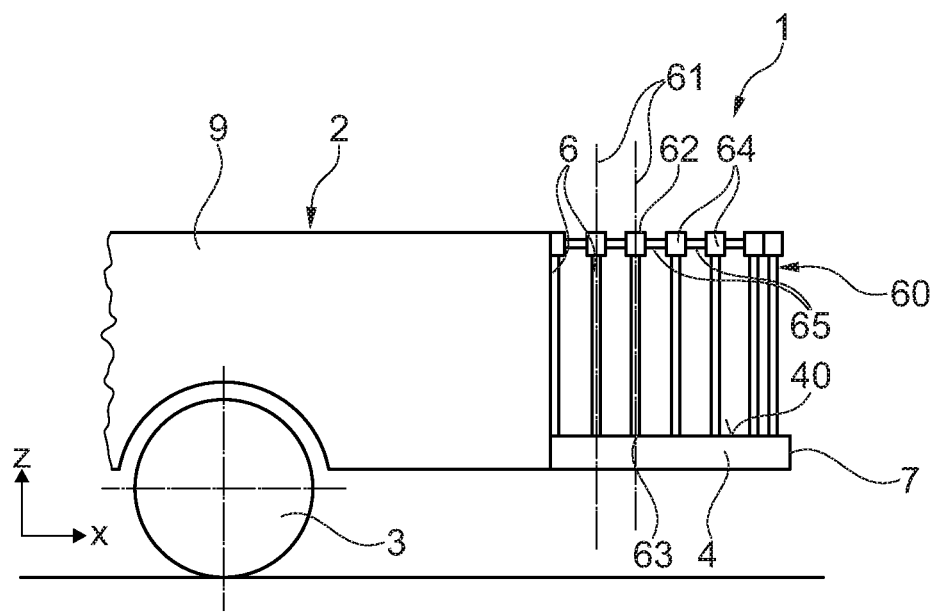
FIG. 3 schematically illustrates the motor vehicle shown in FIGS. 1 and 2 with the tailgate folded down and the device according to the invention pulled out for lateral delimitation as a side view.
Figure 4:
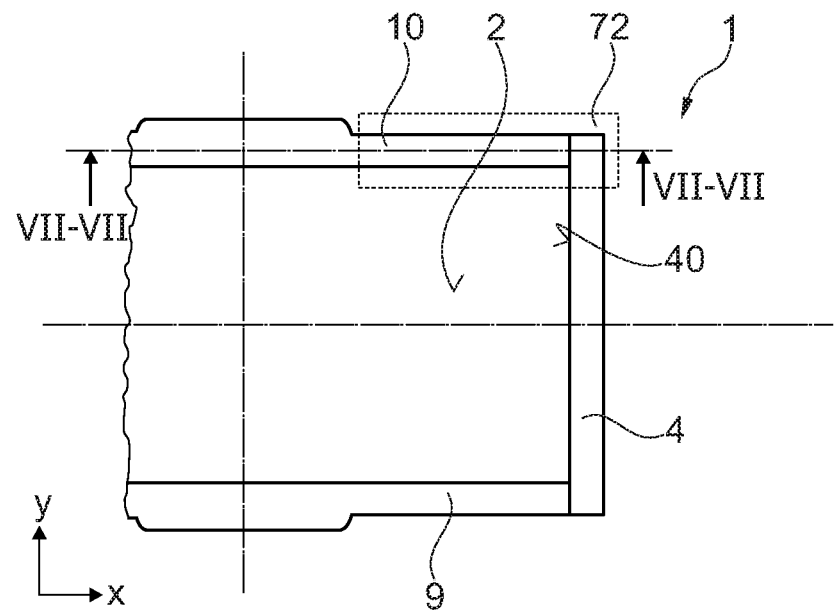
FIG. 4 illustrates the detail of a motor vehicle according to the invention shown in FIG. 1 in plan view.

The tailgate 4 can be opened rearwardly and downwardly. It is arranged vertically in the closed position, as shown in FIG. 1, and arranged horizontally in the folded-out position, as shown in FIG. 2. In the folded-out position shown in FIGS. 2 and 3, the tailgate 4 represents an enlargement, in particular an extension, of the loading area 2. The tailgate 4 in this case comprises an inside or else an inner surface 40 which is available in the opened position as an additional, extended loading area.

The vehicle 1 comprises a device according to the invention for the delimitation of an extended loading area. The device 60 according to the invention comprises a plurality of braces 6. Each of the braces 6 comprises a longitudinal axis 61 which is shown by way of example in FIG. 3 for two of the braces 6. The braces 6 are arranged parallel to one another in relation to their longitudinal axes 61. In this example, the braces 6 are arranged such that their longitudinal axes 61 are parallel to the z-axis.

The braces 6 each comprise a first end 62, in the present exemplary embodiment a vertically upper end, and a second end 63, in the present exemplary embodiment a vertically lower end. Connection means 64 are attached to each of the upper ends 62. It is also a one-piece configuration, wherein the upper end 62 in each case therefore comprises the connection assembly 64. Arranged between each of the connection assemblies 64 are deformable connection elements 65. An embodiment is also possible in which only a portion of the connection elements 65 has a deformable design, while another portion of the connection elements is stiff or rigidly hardened.

Figure 5:
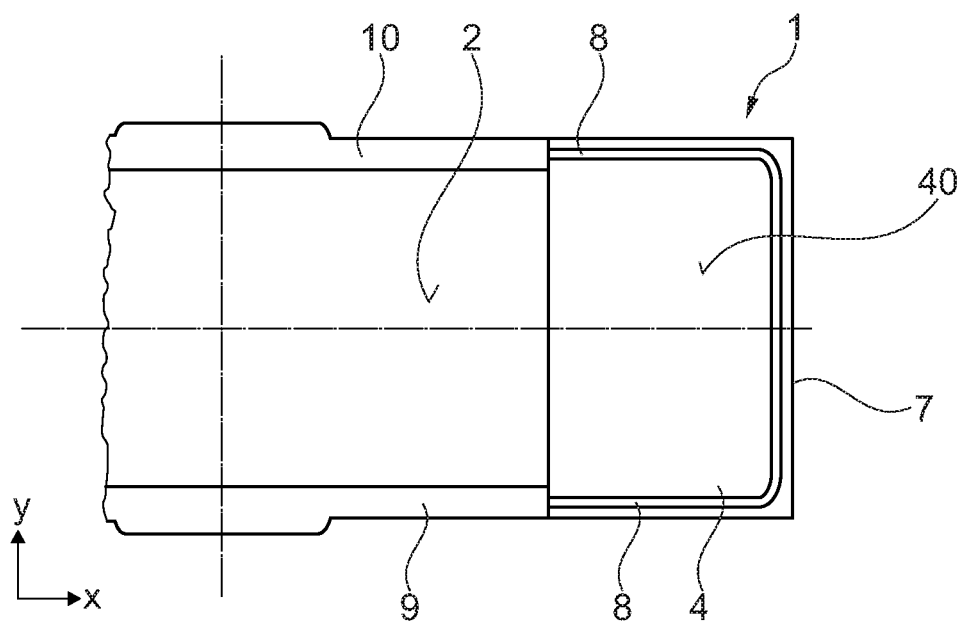
FIG. 5 schematically illustrates the detail shown in FIG. 2 of a motor vehicle according to the invention in plan view.

The lower ends 63 of the braces 6 are configured in such a manner that they can be moved in a guide rail 8 arranged on the inner surface 40 of the tailgate 4. The guide rail 8 is shown in FIG. 5.

Figure 6:
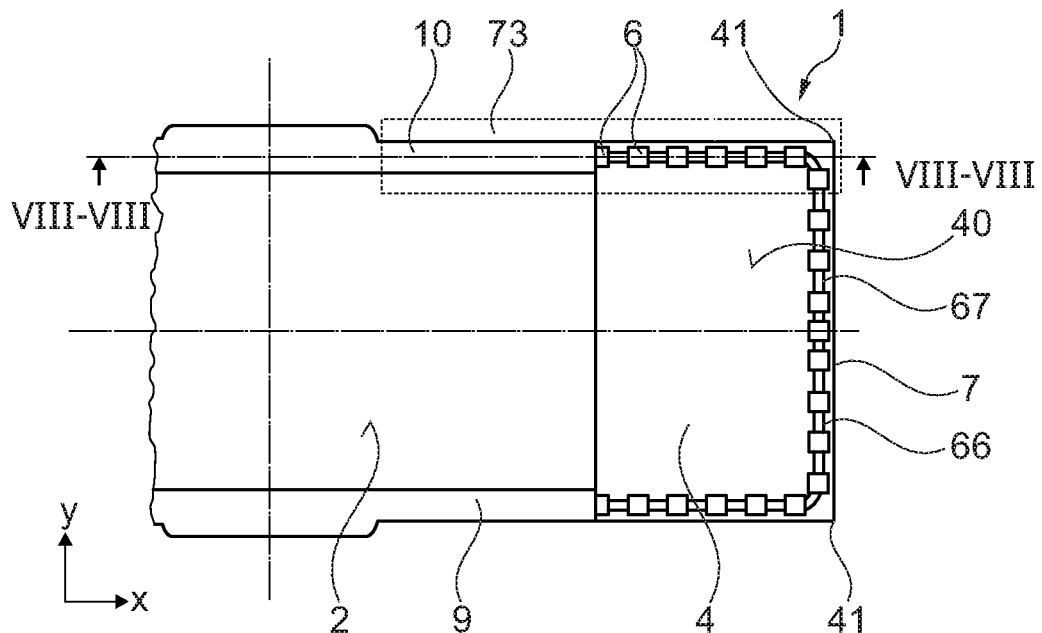
FIG. 6 schematically illustrates the detail shown in FIG. 3 in plan view.
Figure 7:
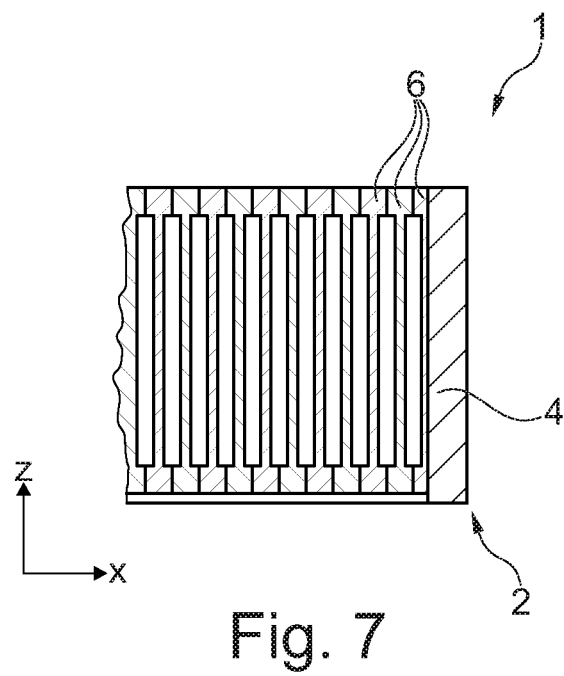
FIG. 7 schematically illustrates the section marked VII-VII in FIG. 4 in the region of the detail identified using the reference number 70.

In the stowed-away position shown in FIG. 7, the device 60 is arranged inside the side walls 9 and 10. With the use of the device 60, the braces 6 are pulled out from the side walls 9 and 10 at the sides along the guide rail 8 and form a delimitation of the extended loading area. This is shown in FIGS. 6 and 8.

In the variant of the embodiment shown, the device 60 according to the invention comprises two device elements 66 and 67. A first device element 66 is arranged on the left side in this case and in the stowed-away position it is pushed into the left side wall 9. The second device element 67 is similarly arranged on the right side and is pushed into the right side wall 10 in the stowed-away position.

The stowed-away position is shown schematically in FIG. 7. The connection assemblies 64 in this case are configured in such a manner that they enclose a cavity 90 shown in detail in FIG. 9. The connection elements 65 are completely pushed into the cavities 90 in the stowed-away position. In this way, particularly space-saving storage is possible.

Figure 8:
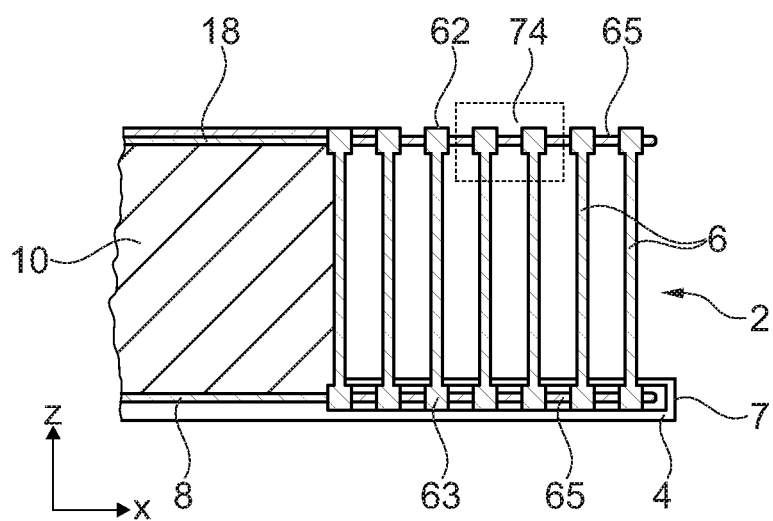
FIG. 8 schematically illustrates the section marked with VIII-VIII in FIG. 6 in the detail identified using the reference number 73.

The pulled-out position is shown in detail in FIG. 8. In the exemplary embodiment described in the present case, connection assemblies with corresponding connection elements, as shown in detail in FIG. 9 for example, are arranged both at the first ends 62 and also at the second ends 63. This embodiment has the advantage that the braces 6 cannot skew in relation to one another in respect of their position, particularly when the delimitation device is pulled out or pushed in. In addition, a stable upper edge and lower edge of the delimitation is formed in this way.

Furthermore, in the case of the variant shown in FIG. 8, a second guide rail 18 is provided alongside the first guide rail 8 which is arranged in the side wall 10 and on the inner surface 40 of the tailgate 4. The second guide rail 18 is arranged vertically above the first guide rail 8 in the side wall 10. In this variant, the lower ends 63 of the braces 6 are configured to move along or in the first guide rail 8 and the upper ends 62 of the braces 6 are configured to move along or in the second guide rail 18.

Figure 9:
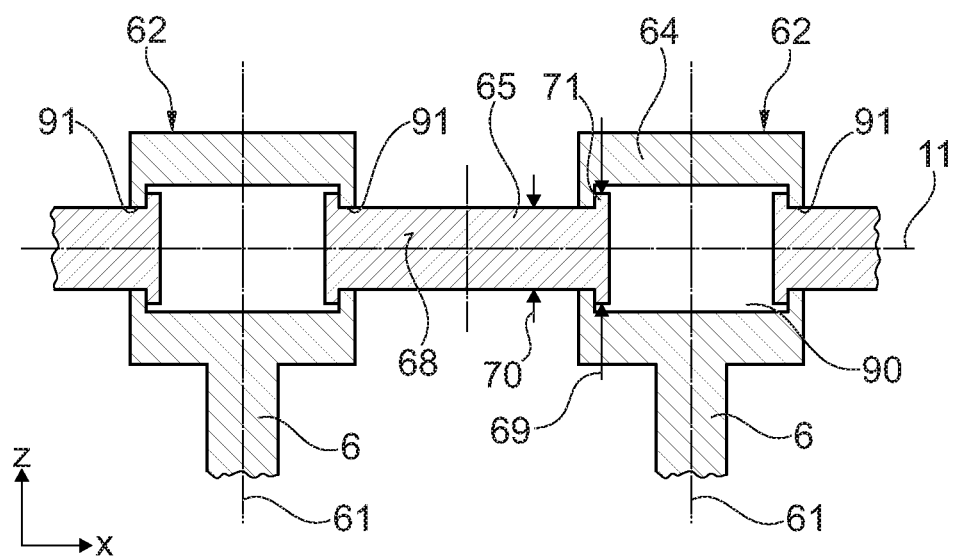
FIG. 9 schematically illustrates the detail identified using the reference number 74 in FIG. 8 as a sectional view.

The connection elements 65 shown in FIG. 9 each comprise a center axis or longitudinal axis 11, two side regions 71 and a center region 68 arranged between the side regions 71. The side regions 71 in this case are arranged within the cavities 90 in the connection assemblies 64. The maximum dimension 69 measured perpendicularly to the longitudinal axis 11, or else the maximum radial dimension or maximum width of the side regions 71, is greater than the maximum dimension or maximum width 70 of the center region 68 measured perpendicularly to the center axis or the longitudinal axis 11.

The connection assemblies 64 each comprise at least one side opening 91. The side openings 91 in this example comprise a center axis which extends perpendicularly to the longitudinal axis 61 of at least one brace 6. In FIG. 9 the center axis of the openings 91 corresponds to the longitudinal axis 11. The side openings 91 are configured in such a manner in relation to their dimensions that the side regions or peripheral regions 71 of the connection elements 65 do not leave the cavities 90 through the openings 91 when the device is in use, so when the braces 6 are pushed together or pulled apart. The openings 91 are furthermore configured in relation to their dimensions in such a manner that the center regions 68 can be pushed through them. In this way, a pushing-together and pulling-apart of the braces 6 is possible.

The connection elements are configured in a deformable manner perpendicularly to the longitudinal axis 61 of the braces 6. This can be achieved through the use of elastic material or through means provided for folding the connection elements 65, with the help of hinges for example. In this way, it is possible for the braces 6 to move around along the guide rail 8 in the region of the corners 41 of the extended loading area, as shown in FIG. 6. In the variant of the embodiment shown in FIG. 6, the two device elements 66 and 67 are configured in such a manner that they encounter one another in the center of the rear edge 7 of the tailgate 4 and can be connected to one another there.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A device for the delimitation of an extended loading area of a motor vehicle, comprising:
   a plurality of braces, each with a longitudinal axis, connected such that spacing between adjacent braces is variable, and wherein adjacent braces are connected together with a connection element deformable perpendicularly relative to the longitudinal axes.

2. The device as recited in claim 1, wherein the longitudinal axes of the braces are substantially parallel to one another.

3. The device as recited in claim 1, wherein:
   at least one of the braces comprises a first end and a second end, and
   at least one of the first end and the second end is configured to be moved along a guide rail.

4. The device as recited in claim 1, wherein the device comprises at least one guide rail configured to allow a movement of the braces along the guide rail.

5. The device as recited in claim 1, wherein the device is configured to be moved into a side wall adjacent a loading area.

6. The device as recited in claim 1, wherein at least one of the braces includes a cavity for at least partially receiving the at least one connection element.

7. The device as recited in claim 6, wherein the at least one brace comprises at least one opening for the at least partial receiving of the connection element.

8. The device as claimed in claim 7, wherein the opening comprises a center axis arranged perpendicularly to the longitudinal axis of the at least one brace.

9. The device as recited in claim 8, wherein the connection element comprises a locking element for resisting removal of the connection element from the cavity.

10. The device as recited in claim 1, wherein the connection element comprises a longitudinal axis and is configured in such a manner that it can be bent or folded in at least one radial direction.

11. The device as recited in claim 10, wherein the connection element comprises elastic material.

12. The device as recited in claim 10, wherein the connection element comprises at least one joint element.

13. A motor vehicle, comprising:
an extended loading area;
a device selectively moveable between a stowed position and a deployed position in which the device delimits the extended loading area, the device comprising a plurality of braces, each with a longitudinal axis, connected such that spacing between adjacent braces is variable, and wherein adjacent braces are connected together with a connection element deformable perpendicularly relative to the longitudinal axes.

14. The motor vehicle as recited in claim 13, further comprising:
a tailgate moveable between an open position and a closed position, the tailgate defining at least a portion of the extended loading area when in the open position.

15. The motor vehicle as recited in claim 14, the tailgate comprises at least one guide rail for receiving ends of the braces, the at least one guide rail guiding movement of the braces.

16. A method, comprising:
delimiting an extended loading area of a motor vehicle by deploying a device including a plurality of braces, each of the braces each having a longitudinal axis, wherein adjacent ones of the braces are connected together with a connection element deformable perpendicularly relative to the longitudinal axes.

17. The method as recited in claim 16, further comprising:
stowing the device by moving the plurality of braces into at least one side wall of the motor vehicle.

18. The method as recited in claim 16, further comprising:
folding a tailgate of the motor vehicle to an open position to provide the extended loading area.

19. The method as recited in claim 18, wherein the step of deploying the device includes guiding the braces along a guide rail formed in the tailgate.

20. The method as recited in claim 16, wherein spacing between adjacent braces is variable.

* * * * *